G. BUNTING.
Churn Dasher.
No. 26,226.
Patented Nov. 22, 1859.
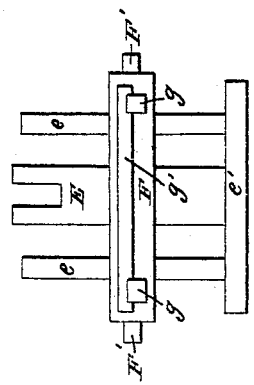
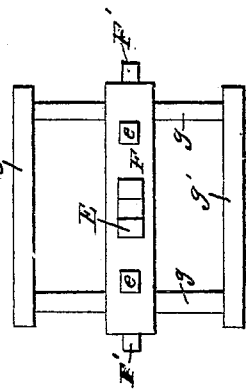
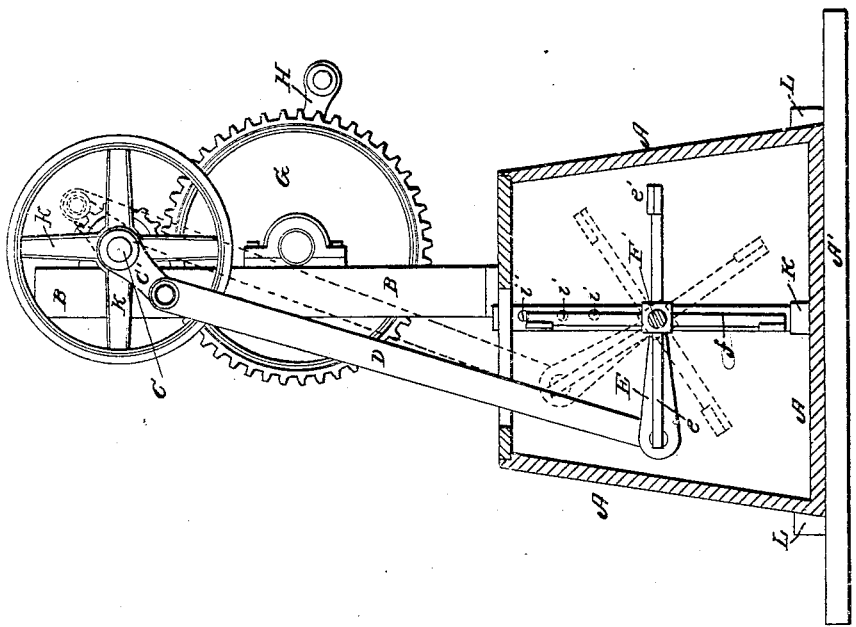
Witnesses:
J. F. Gardner
Elias Jarrell.
Inventor:
Gillett Bunting.

UNITED STATES PATENT OFFICE.

GILLETT BUNTING, OF LIBERTY, INDIANA, ASSIGNOR TO HIMSELF AND W. M. JARRELL, OF SAME PLACE.

CHURN-DASHER.

Specification of Letters Patent No. 26,226, dated November 22, 1859.

*To all whom it may concern:*

Be it known that I, GILLETT BUNTING, of Liberty, in the county of Union and State of Indiana, have invented a new and useful Improvement in Churn-Dashers; and I do hereby declare that the following is a full and clear description thereof, reference being had to the accompanying drawings and to the letters of reference marked thereon and made to form a part of this specification.

The nature of my invention relates to the construction arrangement and operation of an oscillating churn dasher described specified and represented as follows.

In reference to the accompanying drawings, Figure 1, is, a vertical sectional view of the dasher, showing the manner of its operation. Figs. 2 and 3, are side views of the dasher showing the manner of its construction.

(A) represents the shell of a churn within which the dasher may be arranged.

(F) is the shaft of the dasher, formed with journals (F′) which have bearings in adjustable slide pieces (f) shown clearly in, Fig. 1. These slide pieces (f) are adjustable vertically by means of the perforations (i) and set screws (i′) by means of which the dasher may be adjusted to the quantity of cream to be churned; passing at right angles through the shaft (F) are arms (e), (g), provided with buckets (e′) and (g′); and, also passing through the shaft (F) between, and parallel with the arms (e) is a central bar (E), one end of which is attached to the bucket (e′) and the other end pivoted to the rod (D) as shown in, Fig. 1,—permanently secured to the bottom of the churn shell (A) is the stationary, bucket (K) which serves to secure the lower ends of the slides (f) and also to rupture the current of cream as it is made to pass along the bottom of the churn, and thereby facilitate the process of churning.

(G) is a driving cog wheel—which is arranged to work into the cog wheel (h) which is keyed to the crank shaft (C).

(k) is a balance wheel arranged upon the shaft (C).

(B) is a frame upon which the wheels (G) and (h) are arranged. The rod (D) is arranged upon the crank (C′) of the crank shaft (C), so that as the wheel (G) is made to rotate, by means of crank (H) the shaft (C) will be made to rotate through the medium of wheel (h) thereby operating the crank (C′) and rod (D) in such manner as to give oscillating motion to the dasher as clearly shown by the red lines in, Fig. 1; the rapid oscillating motion thus imparted to the dasher, through the medium of buckets (e′ g′, K) forces the cream into violent opposing currents, at the same time, the concussive action of the buckets (e′, g′) and arms (e, g) and bar (E) upon the cream is fully developed, thereby producing, a rapid and violent agitation of the cream, which ruptures its globules or particles, and conduces to a speedy completion of the process of churning. The shell (A) of the churn may be placed upon the bed (A′), within the guides (L), in such manner, as to be removed and replaced at pleasure.

I do not claim the use of the hinged churn-dashers, whether hinged to the bottom or any fixed part of the churn, to give an oscillating movement within the cream. Nor do I claim oscillating movement in churn-dashers, as these devices are already known; but What I do claim as my invention and desire to secure by Letters Patent is, Producing the vibrating movement in the cylindrical churn dasher by means of the combination of said arms with the crank motion of the driving wheel and intermediate connecting rod when these are used in combination with the current breaker K, as set forth.

In testimony of which invention I have hereunto set my hand.

GILLETT BUNTING.

Witnesses:
J. F. GARDNER,
ELIAS JARRELL.